United States Patent [19]

Eaton et al.

[11] Patent Number: 5,190,515
[45] Date of Patent: Mar. 2, 1993

[54] VACUUM DEGASSING APPARATUS

[75] Inventors: Donald E. Eaton, Walworth; Errol S. Francis, Rochester; Eric L. Dillenbeck, Rochester; Lawrence D. Meston, Rochester; Walter Johannes, Rochester, all of N.Y.

[73] Assignee: Eastman Kodak Company, Rochester, N.Y.

[21] Appl. No.: 820,449

[22] Filed: Jan. 13, 1992

[51] Int. Cl.[5] ............ B04B 11/02; B04B 11/08; B04B 15/08
[52] U.S. Cl. .................................. 494/5; 55/163; 55/164; 55/189; 210/110; 494/10; 494/42; 494/56; 494/61; 494/900
[58] Field of Search .............. 494/1, 5, 6, 10, 42, 494/56, 57, 58, 61, 85, 43, 900, 59; 210/360.1, 380.1, 380.3, 369, 372–374, 97, 110, 143; 55/163, 164, 171, 189, 190; 422/72; 366/139

[56] References Cited

U.S. PATENT DOCUMENTS

| | | | |
|---|---|---|---|
| 2,154,134 | 4/1939 | Millar | 494/10 X |
| 2,483,601 | 10/1949 | Van Riel | 210/372 |
| 2,634,907 | 4/1953 | Smith . | |
| 2,785,765 | 3/1957 | Cornell . | |
| 3,019,902 | 2/1962 | McPhee et al. | 210/97 |
| 3,228,595 | 1/1966 | Sharples . | |
| 3,630,432 | 12/1971 | Murkes | 494/42 |
| 3,656,685 | 4/1972 | Kjellgren | 494/42 |
| 3,768,728 | 10/1973 | Hale et al. | 494/10 |
| 3,966,117 | 6/1976 | Johannes . | |
| 3,970,243 | 7/1976 | Hentschel | 494/5 |
| 4,030,897 | 6/1977 | Pelzer et al. | 494/900 X |
| 5,090,953 | 2/1992 | Buttner et al. | 494/1 |

FOREIGN PATENT DOCUMENTS

| | | | |
|---|---|---|---|
| 2441849 | 3/1976 | Fed. Rep. of Germany | 494/6 |
| 52644 | 1/1862 | France | 494/57 |
| 2510429 | 2/1983 | France | 494/1 |
| 979534 | 1/1965 | United Kingdom | 494/6 |
| 1498031 | 1/1978 | United Kingdom | 494/6 |

Primary Examiner—Harvey C. Hornsby
Assistant Examiner—Charles Cooley
Attorney, Agent, or Firm—William T. French; Carl F. Ruoff; Joshua G. Levitt

[57] ABSTRACT

An apparatus for degassing a continuously flowing liquid stream comprising an air-tight housing, in which is mounted for rotation a centrifuge bowl of circular cross-section and having an inner surface for spreading centrifugally impelled liquid to be degassed and an annular peripheral trough for retaining centrifugally impelled degassed liquid. The liquid stream is fed into the bowl and the degassed liquid is withdrawn through a tube extending from an exit line outside the housing to an open end of elongate cross-section which is positioned within the trough of the bowl and is immersible in the degassed liquid. The apparatus further provides for measuring the pressure of the exiting degassed liquid, the pressure measurement being used to regulate the flow of liquid into the bowl so as to maintain a substantially constant level of liquid therein. The apparatus also provides for the withdrawal of gas to maintain a sub-atmospheric pressure within the apparatus housing, and for the regulation of the flow of the degassed liquid stream.

8 Claims, 4 Drawing Sheets

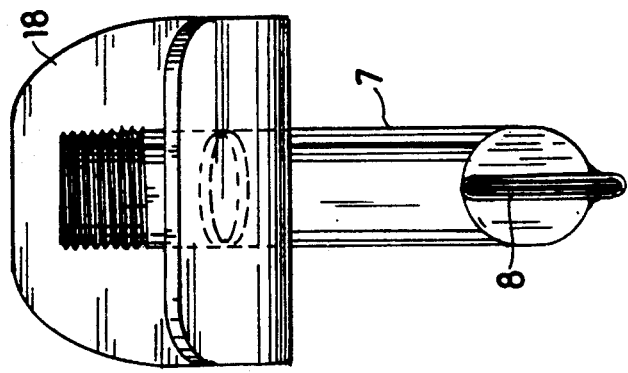
FIG. 5
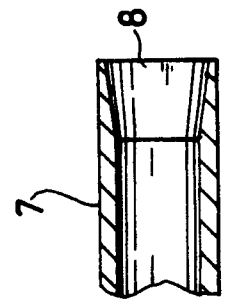
FIG. 7
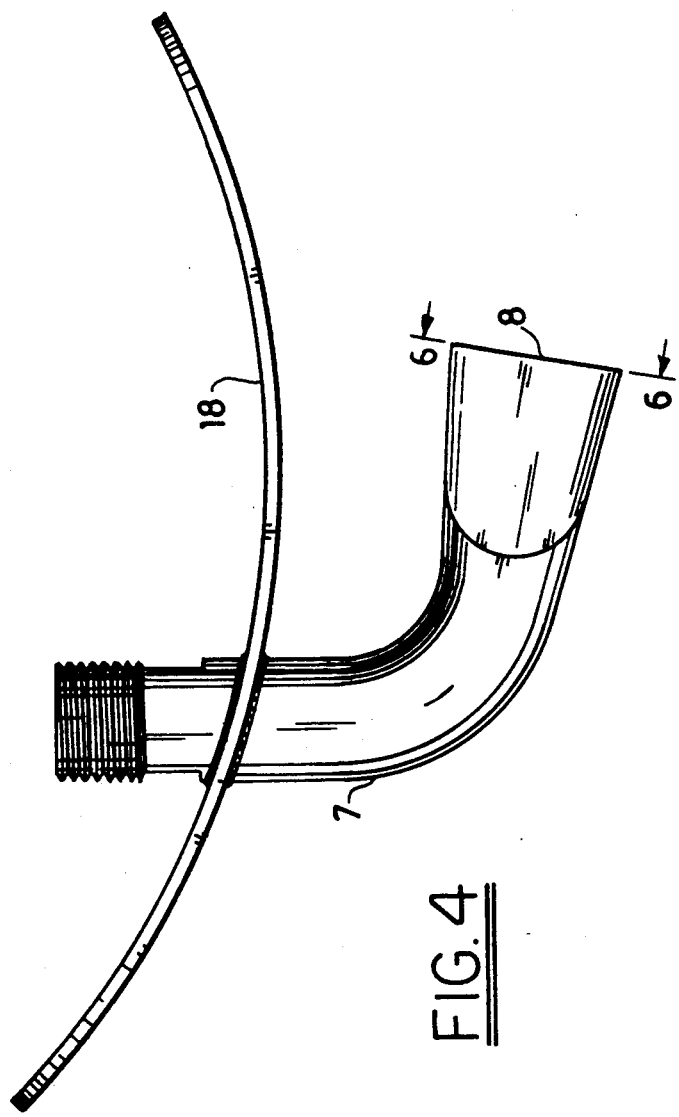
FIG. 4
FIG. 6
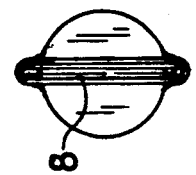

VACUUM DEGASSING APPARATUS

FIELD OF THE INVENTION

The present invention relates to an apparatus for degassing liquids and more particularly to an apparatus for degassing liquids at sub-atmospheric pressures, and to a process for degassing liquids.

BACKGROUND OF THE INVENTION

Many liquids used in industrial processes contain entrained and/or dissolved gases such as air as a consequence of the mode of their preparation or purification. Removal of these gases is frequently necessary to carry out the aforementioned industrial processes satisfactorily, but this is often difficult to accomplish as, for example, in the case of foamy or viscous liquids. In the manufacture of photographic products, in particular, it is essential to remove bubbles of air from the prepared solutions, which can be foamy as well as viscous, and to prevent subsequent formation of new bubbles in the solutions in order to ensure a uniform, smooth coating of the required thickness.

U.S. Pat. No. 2,634,907 discloses a centrifuging process and apparatus for continuously removing gas in which the liquid to be deaerated is fed into the centrifugal zone of a cylindrical rotor and the deaerated liquid is removed through a liquid seal into a substantially gas-free collecting zone. The level of liquid within the rotor chamber is preferably controlled by the size of the opening in an orifice plate valve located at the outlet.

U.S. Pat. No. 2,785,765 discloses a centrifuging apparatus for degassing liquids, which apparatus contains, in an air-tight housing, a generally dome-shaped rotatable member under a condition of partial vacuum into which liquid is fed through a "buttering ring" and from which the treated liquid is removed by a scoop that is a hollow tube of curved contour.

U.S. Pat. No. 3,228,595 discloses a centrifuge discharge means that is a skimmer having an elongate body and a leading end that is divided into an upper opening and a lower opening. The skimmer in operation is only partly immersed in the liquid to reduce the foaming tendency of the liquid.

Some fluids which are required to be degassed are not solutions but rather suspensions or emulsions. U.S. Pat. No. 3,996,117 discloses a discharge device for removing a fluid from a fluid processing apparatus, which device causes the fluid to flow around its converging side surfaces in a streamlined flow pattern and causes sufficient sub-surface turbulence to keep particles originally dispersed throughout the fluid from settling toward the bottom, which device further, by means of one or more inlet ports in its side surfaces, enables fluid to flow to the outlet of the fluid processing apparatus.

A vacuum degassing centrifuge apparatus ideally operates in a steady state condition in which the level of degassing liquid in the annular trough of the centrifuge bowl is maintained at a substantially constant level. This condition could theoretically be attained by using two perfectly matched pumps that produce exactly equal inlet and outlet rates. In practice this situation is virtually impossible to achieve, particularly when one takes into account other potential disruptions in this theoretical equilibrium condition, for example, when it becomes necessary to change a filter in the system. Under these circumstances there is a need for an additional means of controlling the level of liquid in the centrifuge bowl.

One such means of liquid level control that has been employed utilizes sensing probes located within the trough of the centrifuge bowl. In particular, conductivity sensors have been mounted on the leading edge of the centrifuge discharge device disclosed in U.S. Pat. No. 3,966,117. If a conductivity sensor immersed in the collected liquid becomes uncovered, a valve is opened to allow more liquid to enter the bowl. As the sensor again becomes covered, the valve is closed to stop the inflow.

The above described method of sensing and controlling the level of liquid in the centrifuge bowl is disadvantageous in that the operation of the valve is abrupt, leading to significant pressure fluctuations. The larger variations in pressure give rise to a hydraulic hammering effect that damages filters in the system. Smaller pressure changes, on the other hand, cause flow spikes in the degassed liquid exiting the apparatus; if that liquid is, for example, a photographic emulsion to be coated, an uneven, defective coating is the result.

BRIEF SUMMARY OF THE INVENTION

The present invention provides an apparatus for degassing a continuously flowing liquid feed stream which comprises an air-tight housing, in which is mounted for rotation about an axis a centrifuge bowl having a circular cross-section. The axis of rotation extends through the center of and perpendicular to the cross-section of the bowl. The bowl has an inner surface for the spreading of centrifugally impelled liquid in a thin layer and an annular peripheral trough for retaining centrifugally impelled liquid as the bowl rotates. The apparatus in accordance with the invention further comprises means for feeding the aforementioned liquid stream into the centrifuge bowl and means for withdrawing from the bowl a stream of degassed liquid which includes a tube extending from an exit line outside of the apparatus housing to an open end of elongated cross section which is positioned within the annular trough of the bowl and which is immersible in the degassed liquid. The apparatus in accordance with the invention further comprises a means for measuring the pressure of the degassed liquid stream exiting the centrifuge bowl through the aforementioned tube, a means responsive to the aforementioned means of measuring the pressure of degassed liquid in order to regulate the flow of the liquid feed stream into the centrifuge bowl so as to maintain a substantially constant level of liquid in the annular trough of the bowl, a means of withdrawing gas from the apparatus housing and maintaining therein a sub-atmospheric pressure, and a means for regulating the flow of the degassed liquid stream.

BRIEF DESCRIPTION OF THE DRAWINGS

FIG. 4 is a detailed side view of the tube and splash guard as employed in a preferred embodiment of the invention.

FIG. 5 is a detailed end view of the same portion of the apparatus as in FIG. 4.

FIGS. 6 and 7 are detailed end and side views, respectively of the tube depicted in FIGS. 4 and 5.

DETAILED DESCRIPTION OF THE INVENTION

The present invention overcomes the aforementioned disadvantages of previously known methods of sensing and controlling the liquid level in the centrifuge bowl by measuring the pressure of the degassed liquid in the exit line outside of the degassing apparatus, which increases with increasing liquid level in the bowl, and using that measured pressure to regulate the inflow of liquid so as to maintain the level of liquid in the centrifuge bowl at a substantially constant level.

Figure 1:
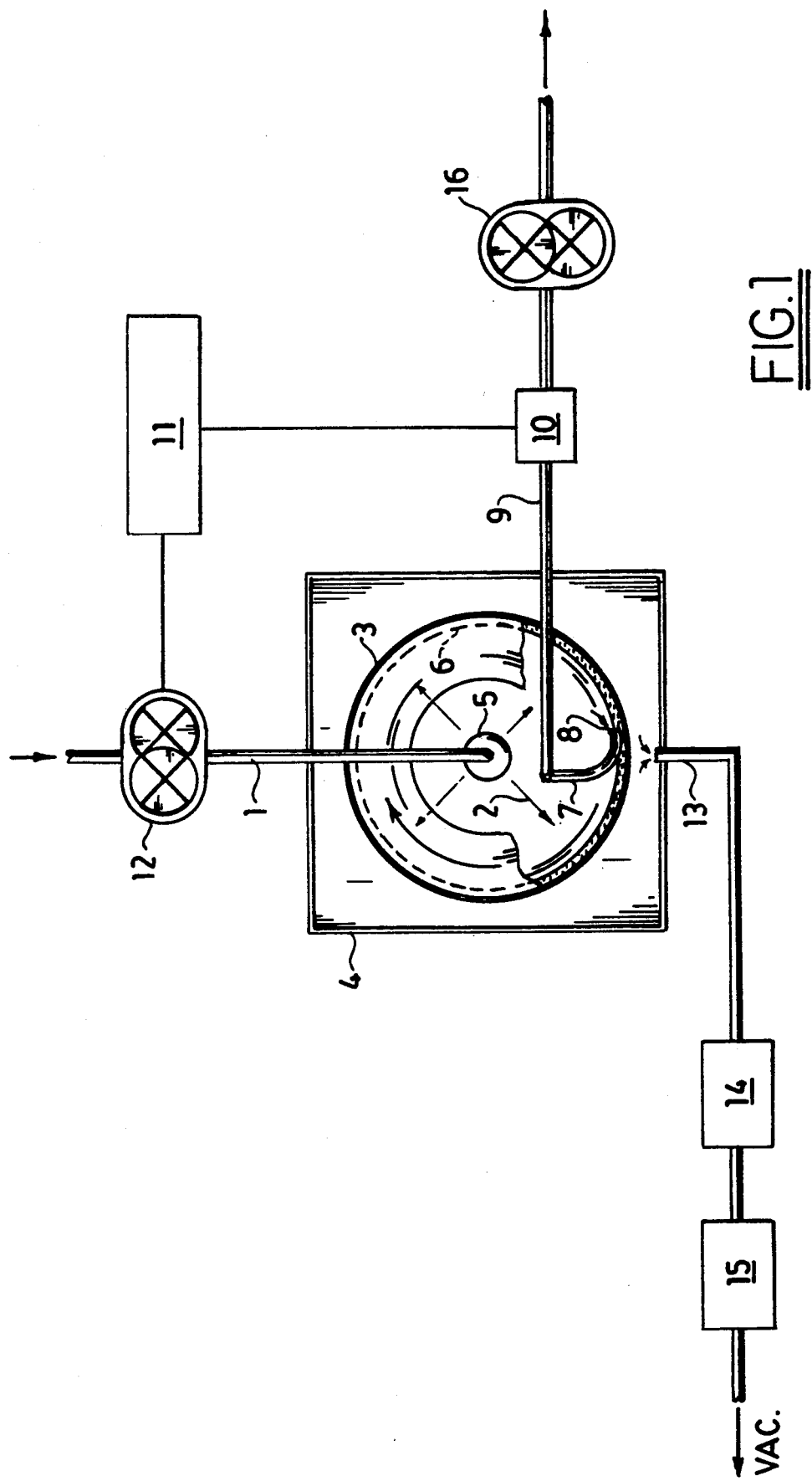
FIG. 1 is a diagrammatic representation of the apparatus of the invention.

FIG. 1 is a diagrammatic representation of the vacuum degassing apparatus of the invention. The liquid to be degassed is fed by inlet line 1 into the center of the inner surface 2 of a centrifuge bowl 3, which is located within an air-tight housing 4 and is mounted for rotation about an axis 5. In the representation of FIG. 1 the bowl is mounted for rotation about a horizontal axis.

FIG. 1 also depicts the annular peripheral trough 6 of the centrifuge bowl, which retains the centrifugally impelled liquid as the bowl rotates; a tube 7 with an open end 8 is positioned within the trough of the bowl and connected to exit line 9. A means for measuring the pressure of the degassed liquid, pressure sensor 10, is connected with a means for regulating the flow of the liquid feed stream, control element 11 and pump 12, thereby maintaining a substantially constant level of liquid in the trough of the centrifuge bowl. Gas is withdrawn from the air-tight housing through the vacuum line 13 by means of the vacuum control 14 and the vacuum source 15. The metering pump 16 regulates the flow of the degassed liquid.

In FIG. 1 a variable speed positive displacement pump 12 is depicted for feeding the liquid stream into the bowl. Other suitable means include a centrifuge pump, a gear pump, a valve, a pressurized supply tank, a gravity feed means, or a combination thereof.

In accordance with the invention, the pressure of the degassed liquid stream in line 9 is measured by a pressure sensor 10. The latter can be any of a number of well known devices for measuring the pressure of a liquid stream, such as an electrical transducer. Also suitable is a pneumatic transducer, a hydraulic gauge, or a combination of such devices.

The means responsive to the pressure sensor 10, the control element 11, can be a computer, a programmable logic controller, a proportional integral derivative controller, or a combination thereof.

In accordance with the invention, means for withdrawing gas from the air-tight housing include the vacuum control 14, which can be a valve, a computer, a programmable logic controller, or a combination thereof, and a vacuum source 15, which is preferably a water ring pump. Other suitable devices include a diffusion pump, a mechanical pump, an aspirator, or a combination thereof.

In FIG. 1 a positive displacement pump is depicted as the metering pump 16. Other suitable means for regulating the flow of the degassed liquid include a centrifuge pump, a gear pump, a valve, or a combination of such devices.

Figure 3:
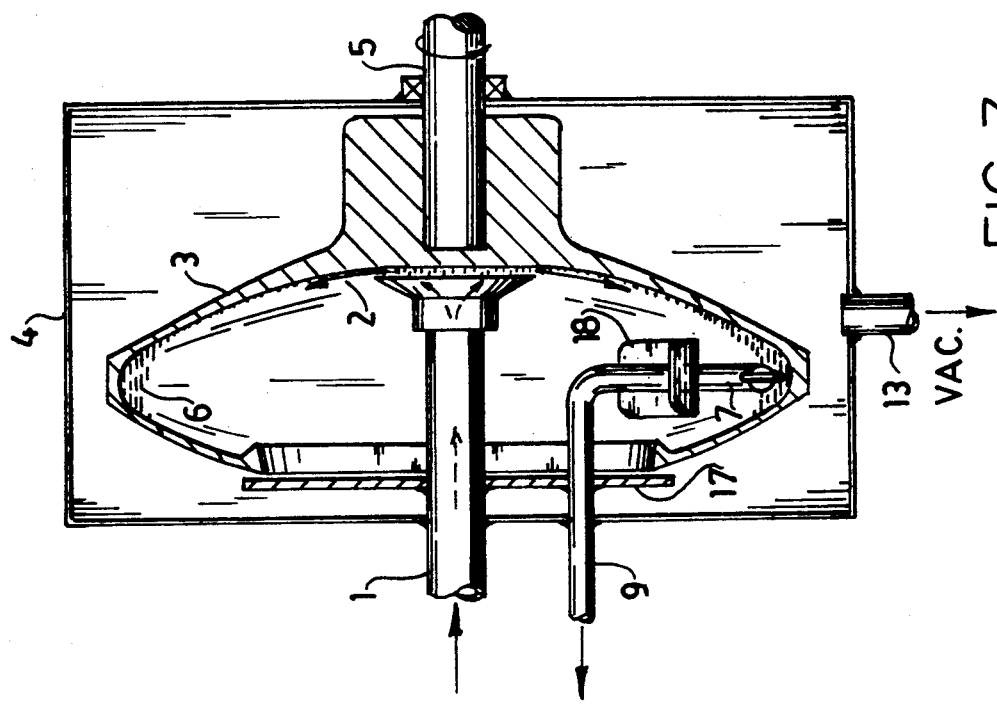
FIG. 3 is an end cross-sectional view of the apparatus of FIG. 2.
Figure 2:
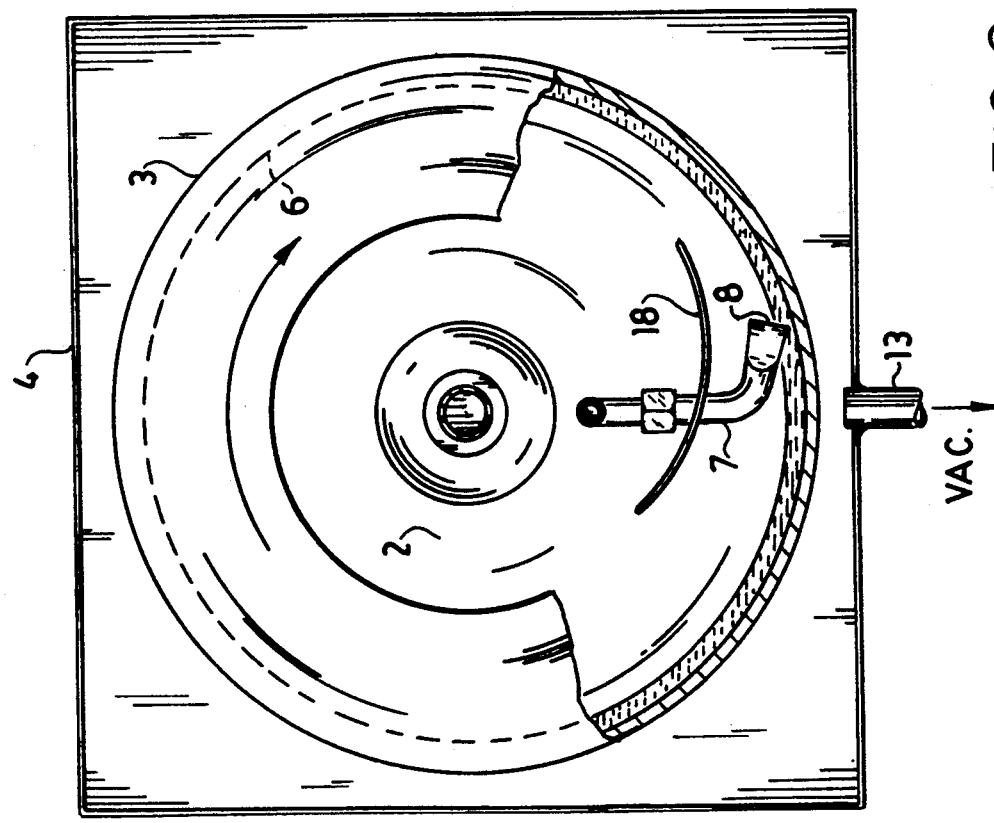
FIG. 2 is a front view, with a part broken away, of the centrifuge bowl, tube, and housing of an embodiment of the invention.

FIGS. 2 and 3 depict in detail an embodiment of the invention, showing the inlet line 1 which feeds the liquid onto the inner surface 2 of the centrifuge bowl 3, which is located within the airtight housing 4 and is mounted for rotation on the axis 5. A splash plate 17 is mounted over the mouth of the bowl. Also shown are the annular peripheral trough 6 and the tube 7 with its open end 8 positioned within the trough and connected to the exit line 9. Affixed to the tube is a splash guard 18.

In FIGS. 4, 5 and 6 are depicted a preferred embodiment of the tube 7, in which its open end 8 has been shaped to produce an elongate cross-section which has a ratio of the long dimension to the short dimension of about 10:1. Also shown is the splash guard 18.

FIG. 7 provides further detail of the chamfered open end 8 of the tube 7, that has been formed into an elongate shape with a sharp streamlined edge.

Figure 8:
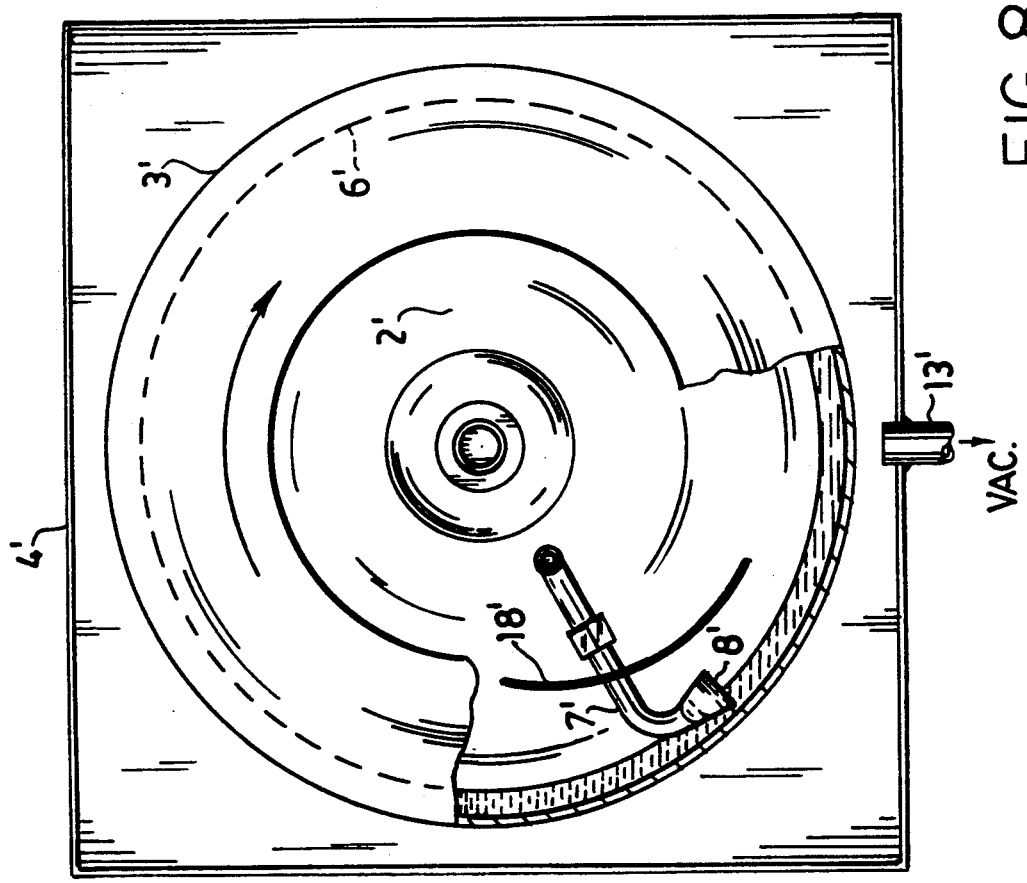
FIG. 8 is a view, similar to that of FIG. 2, showing the position of the tube in the centrifuge bowl and the orientation of the open end of the tube in a preferred embodiment of the invention.

In FIG. 8 is depicted a preferred embodiment of the invention, in which the open end 8' of the tube 7' is substantially perpendicular to the direction of liquid movement and is preferably positioned, for the purpose of reducing splashing, at an angle of from about 90° to about 45°, as measured from the perpendicular from the axis to the lowermost point of the centrifuge bowl.

The shape of the open end 8 of the tube 7 affects the fluctuations in the pressure of the degassed liquid exiting the apparatus of the invention. This is demonstrated by the tests that are described in the following example.

EXAMPLE

A series of four tubes was made from pieces of nominal $\frac{1}{2}$" I.D. stainless steel tubing which had been bent into the shape depicted in FIG. 3. The inner edge of the open end of the tube was smoothed to a sharp streamlined edge, and the ends of the tubes were crimped to produce elongate cross-sections of various dimensions. The crimp in each case was about 2.54 cm (1 in) in length, but it was separately determined that variations in the length of the crimp did not significantly affect pressure pulsations. The tubes thus produced had elongate cross-sections in which the ratios of long dimension to short dimension were 5:1, 10:1, and 20:1, respectively. In addition, an uncrimped tube with a round open end was included in the test. The tubes were positioned inside the centrifuge bowl of the vacuum degasser test apparatus, and a gelatin solution with a viscosity of 40 cp was fed into the apparatus at a flow rate of about 18 kg/min. The tubes in the degasser were connected by a 3.6-m length of flexible tubing to a Data Instruments AB™ pressure transducer with a range of 0-100 psi (0-689.5 KPa). Signals from the transducer were fed to a Keithley data acquisition system (from Keithley/Asyst Co.) which had been configured to collect pressure readings at a frequency of 25 Hz over a span of 12 seconds.

The following table lists the standard deviations in the outlet liquid pressure that were determined for the four tubes included in the test:

| Cross-section of tube | Outlet liquid pressure standard deviation | |
|---|---|---|
| | psi | KPa |
| round | .737 | 5.08 |
| elongate (5:1) | .542 | 3.74 |
| elongate (10:1) | .344 | 2.37 |
| elongate (20:1) | .252 | 1.74 |

These results show the significant reduction in liquid pressure fluctuation that resulted from changing the cross-section of the tube opening from round to elongate with a dimensional ratio of 10:1. A further lowering of pressure variations was observed with the tube having an opening with a 20:1 elongate cross-section, but this improvement was accompanied by a further reduction in flow rate, so the 10:1 elongate tube opening was preferred.

The pressure of degassed liquid exiting the centrifuge bowl that is used to regulate the flow of the liquid stream and maintain a substantially constant liquid level in the bowl in accordance with the invention is dependent on the aforementioned liquid level, the pre-determined speed of rotation of the bowl, and, to a lesser extent, the viscosity of the liquid. Adjustment of the pressure set point enables the apparatus of the invention to be employed to degas solutions with viscosities of from less than 1 to about 250 cp.

Measuring the pressure of degassed liquid in the exit line outside of the degassing apparatus and using that measured pressure in accordance with the invention to regulate the inflow of liquid by means of a variable speed positive displacement pump so as to maintain the level of liquid in the centrifuge bowl at a substantially constant level enabled the fluctuations in the pressure of exiting liquid to be minimized and maintained in the range from about 1.4 to about 2.8 KPa. This was a very significant improvement over the results obtained when the inflow of liquid in the centrifuge bowl was controlled by a valve that was regulated by a conductivity sensor located within the bowl, under which circumstances liquid pressure fluctuations from about 35 to about 50 KPa were observed.

An additional advantage of using pressure measurements in accordance with the invention rather than conductivity measurements to maintain a substantially constant level of liquid in the bowl is that the apparatus of the invention can be used to degas liquids of low conductivity, for example, organic solvents.

In accordance with the invention, a sub-atmospheric pressure is maintained within the air-tight housing of the vacuum degassing apparatus. In a preferred embodiment, a water ring pump is used to produce a pressure of about 10 KPa.

The invention has been described in detail with particular reference to preferred embodiments thereof, but it will be understood that variations and modifications can be effected within the spirit and scope of the invention.

We claim:

1. An apparatus for degassing a continuously flowing liquid feed stream which comprises:

an air-tight housing;

means for removing gas from within said housing and for maintaining therein a sub-atmospheric pressure;

said housing containing a centrifuge bowl having a circular cross-section, said bowl being mounted for rotation about an axis extending through the center of and perpendicular to said circular cross-section;

said bowl having an inner surface for the spreading of centrifugally impelled liquid in a thin layer and an annular peripheral trough for retaining centrifugally impelled liquid as the bowl rotates;

means for feeding said liquid feed stream into said bowl;

means for withdrawing a degassed liquid stream from said bowl which includes a tube extending from an exit line outside of said housing to an open end of said tube that is positioned within the annular trough of said bowl and is immersible in the liquid therein;

means for measuring the pressure of the degassed liquid stream withdrawn from said bowl through said tube;

means responsive to said pressure measuring means for regulating the flow of the liquid feed stream into said bowl to maintain a substantially constant level of liquid in the annular trough of said bowl; and means for regulating the flow of the degassed liquid stream withdrawn from said bowl.

2. An apparatus according to claim 1 wherein said bowl is mounted for rotation about a horizontal axis.

3. An apparatus according to claim 2 wherein the bowl rotates in one direction and the open end of said tube is positioned counter to the direction of rotation of said bowl.

4. An apparatus according to claim 3 wherein the degassed liquid stream flows in one direction and the open end of said tube is positioned substantially perpendicular to the direction of flow of the degassed liquid stream.

5. An apparatus according to claim 4 wherein the open end of said tube is positioned at an angle of form about 90° to about 45° relative to the perpendicular from said horizontal axis to the lowermost point of the annular peripheral trough of said bowl.

6. An apparatus according to claim 1 wherein the open end of said tube has an elongate cross-section.

7. An apparatus according to claim 6 wherein said elongate cross-section has a long dimension and a short dimension and a ratio of the long dimension to the short dimension of from about 3:1 to about 20:1.

8. An apparatus according to claim 7 wherein the ratio of the long dimension to the short dimension is about 10:1.

* * * * *